(No Model.) 2 Sheets—Sheet 2.

J. G. KLENK.
CENTRIFUGAL MACHINE.

No. 573,090. Patented Dec. 15, 1896.

Witnesses:
W. A. Schaefer.
O. H. Worrals.

Inventor:
John G. Klenk
by his attorney
Chas. A. Reuter

UNITED STATES PATENT OFFICE.

JOHN G. KLENK, OF PHILADELPHIA, PENNSYLVANIA.

CENTRIFUGAL MACHINE.

SPECIFICATION forming part of Letters Patent No. 573,090, dated December 15, 1896.

Application filed May 12, 1896. Serial No. 591,252. (No model.)

*To all whom it may concern:*

Be it known that I, JOHN G. KLENK, a citizen of the United States, and a resident of the city and county of Philadelphia, State of Pennsylvania, have invented certain new and useful Improvements in Centrifugal Machines, of which the following is a specification.

My invention relates to improvements in centrifugal machines, and more particularly to improvements in that class of centrifugal machines which are used to separate cream from milk.

Figure 1:
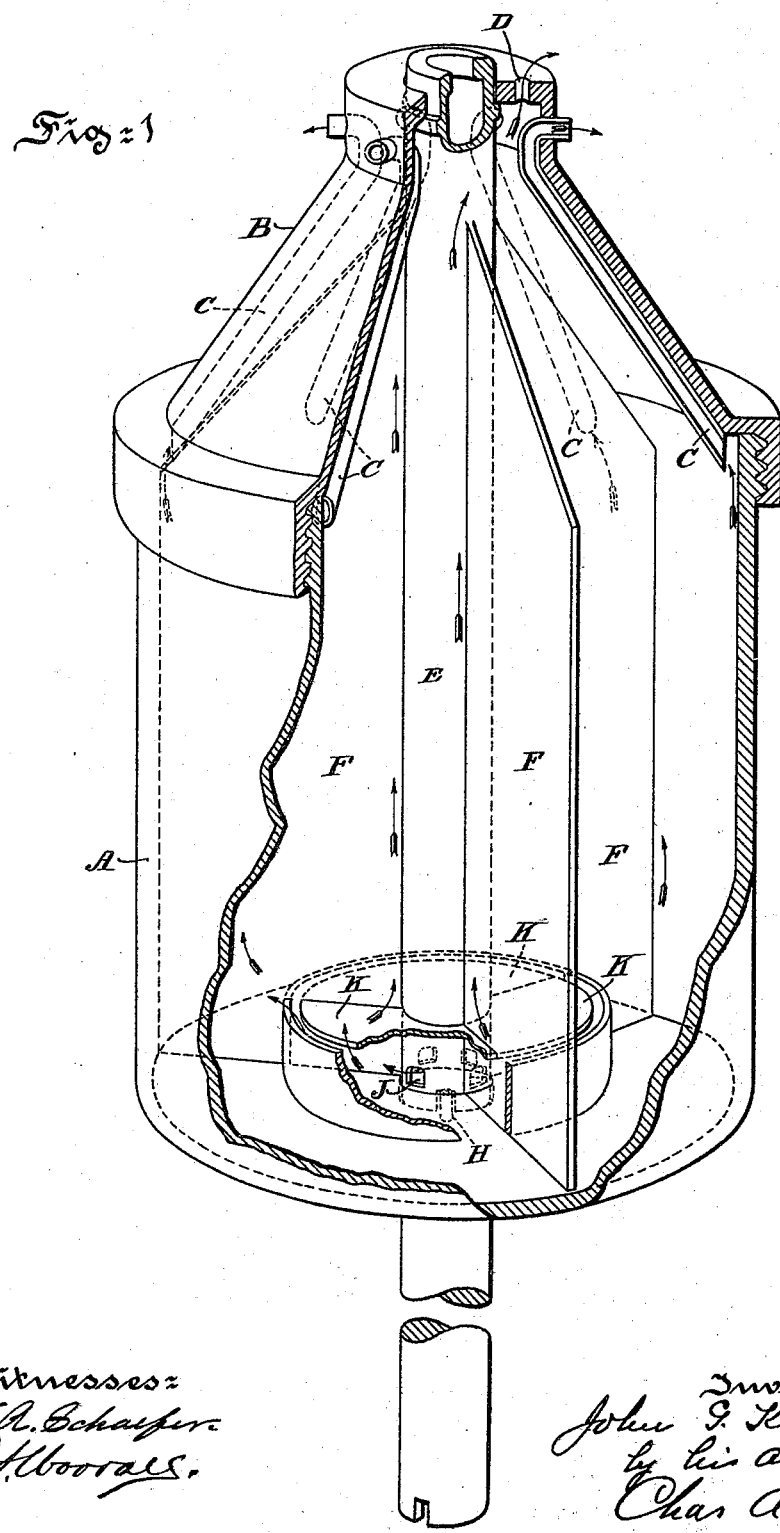
Figure 2:
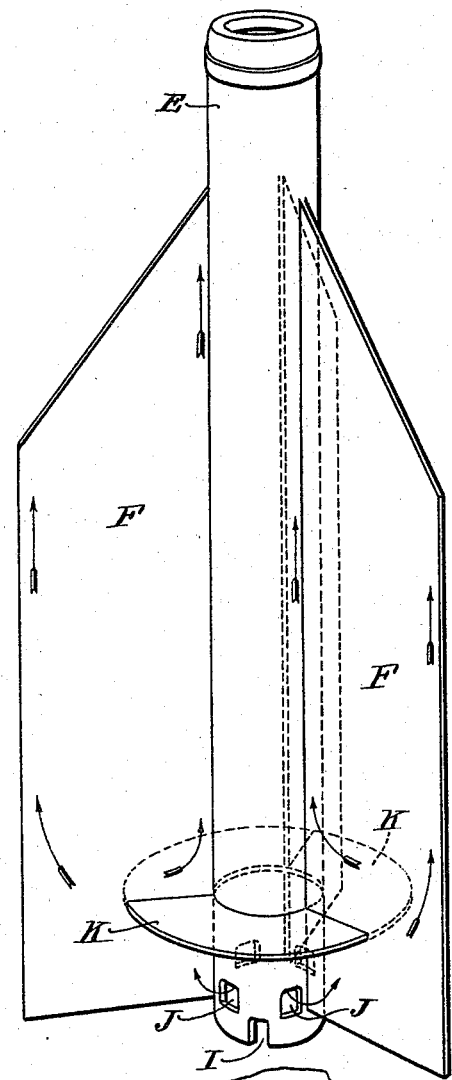
Figure 3:
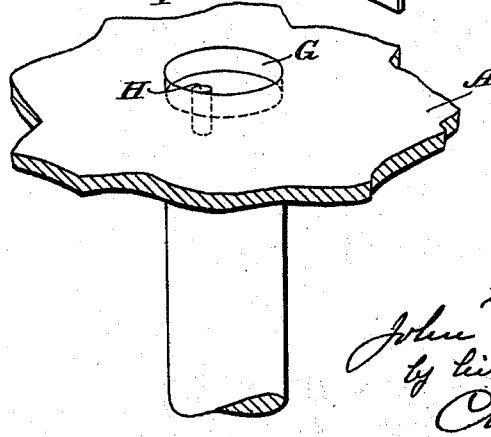

In the accompanying drawings, forming part of this specification and in which similar letters of reference indicate similar parts throughout the several views, Figure 1 is a perspective view, partly in section, of a centrifugal machine embodying my improvements; Fig. 2, a perspective view of the central tube through which full milk is fed to the machine and its attachments which constitute my improvements; and Fig. 3, a perspective view of part of the bottom of the bowl, showing step for central tube.

The bowl of the machine consists of two parts, an under or main part A and an upper part or top B, which is detachably secured, preferably by screw-threads, to the under part A. The upper part or top is furnished with outlets C at its periphery for the skimmed milk and with an outlet or outlets D upon its upper end for the cream, as is usual in machines of this class.

E is a vertical tube placed centrally in the bowl; F, two or more wings carried by or formed integrally with tube E. These wings extend from the tube to the sides of the bowl and divide the bowl into two or more compartments.

G (best shown in Fig. 3) is a step which receives the lower end of the tube E; H, a stop adapted to engage a slot I in the lower end of the tube E to prevent this tube and its connected parts from turning independently of the bowl.

J are holes in the tube E, through which full milk is discharged from this tube to the bowl.

K is a horizontal plate or disk carried by tube E and wings F. This partition or disk is placed above the holes J and extends out about half-way of the width of the wings.

In operation the machine is rapidly rotated by any approved means, and full milk is fed to the top of the tube E and passes out of this tube through holes J under the plate or disk K. The rapid movement of the bowl causes the milk to pass out of the holes J in a horizontal direction, its watery or heavier parts being separated from its fatty or lighter parts, the former passing at once to the sides of the bowl, the latter, after having passed the periphery of the plate or disk K, passing inward toward the tube E. As full milk is fed into the tube E the level of the separated milk in the bowl rises and presently the skimmed milk is discharged through the outlets C, and the cream is discharged through outlet or outlets D.

L, Fig. 1, is a ring carried by wings F, the base of which is adapted to rest upon the bottom of bowl A and the top of which rises approximately to the level of the plate K. This ring is of somewhat greater diameter than the plate K, leaving an annular space between it and the periphery of the plate, as shown. When this ring is used, a more or less complete separation of the milk takes place within it, the partly-separated milk is discharged through the annular space between this ring and plate K, when the heavier particles are thrown out to the sides of the bowl, and the lighter particles find their way to the interior, both being presently discharged from the bowl in the usual manner.

The tube E and its connected parts can be removed from the bowl at any time and easily and thoroughly cleaned.

Having thus described my invention, I claim as new and desire to secure by Letters Patent—

1. In a centrifugal machine, in combination, a bowl, milk and cream outlets at the top of said bowl, a central feeding-tube removably carried by said bowl, two or more wings carried by said tube and extending outwardly to the inner wall of the bowl, dividing said bowl into two or more chambers, means for locking said tube and wings to said bowl, outlets at or near the bottom of said tube, and a horizontal plate or disk substantially as described carried by said tube and wings and placed above said outlets in said tube.

2. In a centrifugal machine, in combination, a bowl, milk and cream outlets at the top of said bowl, a central feeding-tube removably carried by said bowl, two or more wings carried by or formed integrally with said tube dividing said bowl into two or more compartments, means for locking said tube and its connected parts to said bowl, outlets at or near the bottom of said tube, a horizontal plate or disk carried by said tube and wings and placed above said outlets, and a ring of somewhat greater diameter than the diameter of said plate or disk carried by said wings the bottom of which is adapted to rest upon the bottom of the bowl and the top of which is approximately on the same level as that of said plate or disk.

3. The combination with the central feeding-tube of a centrifugal milk-separating machine of two or more wings carried by or formed integrally therewith, milk-outlets at or near the bottom of said tube, and a horizontal plate or disk carried by said tube and wings placed above said outlets and extending outward about half the width of said wings.

JOHN G. KLENK.

Witnesses:
CHRISTOPHER FALLON,
CHAS. A. RUTTER.